: United States Patent (10) Patent No.: US 7,561,217 B2
Hu et al. (45) Date of Patent: Jul. 14, 2009

(54) LIQUID CRYSTAL DISPLAY APPARATUS AND METHOD FOR IMPROVING PRECISION 2D/3D VIEWING WITH AN ADJUSTABLE BACKLIGHT UNIT

(75) Inventors: Chih-Jen Hu, Jhongli (TW); Chih-Ming Chang, Jhongli (TW); Ching-Yu Tsai, Hsinchu (TW)

(73) Assignee: AU Optronics Corporation (TW)

( * ) Notice: Subject to any disclaimer, the term of this patent is extended or adjusted under 35 U.S.C. 154(b) by 316 days.

(21) Appl. No.: 10/936,521

(22) Filed: Sep. 9, 2004

(65) Prior Publication Data

US 2006/0050197 A1 Mar. 9, 2006

(51) Int. Cl.
*G02F 1/1335* (2006.01)
*H04N 13/04* (2006.01)
(52) U.S. Cl. ............................ 349/15; 348/54; 348/59
(58) Field of Classification Search .................. 349/15; 345/6; 348/51, 54, 59
See application file for complete search history.

(56) References Cited

U.S. PATENT DOCUMENTS 6,023,277 A * 2/2000 Osaka et al. ............... 345/419
6,046,849 A * 4/2000 Moseley et al. ............. 359/465
6,337,721 B1 * 1/2002 Hamagishi et al. ........... 349/15
6,801,263 B2 * 10/2004 Sato et al. ................... 349/15
7,139,042 B2 * 11/2006 Nam et al. ................... 349/15
2003/0063234 A1 * 4/2003 Oda et al. .................... 349/65
2003/0161040 A1 8/2003 Ishii et al.
2004/0041747 A1 * 3/2004 Uehara et al. ................ 345/6
2006/0262558 A1 * 11/2006 Cornelissen ............... 362/613

FOREIGN PATENT DOCUMENTS

JP 2003-322824 A 11/2003

* cited by examiner

*Primary Examiner*—Andrew Schechter
(74) *Attorney, Agent, or Firm*—Arent Fox LLP.

(57) ABSTRACT

An liquid crystal method, system and method is provided to optimize the view-angle distribution characteristics of 2D/3D LCDs, wherein the photoactive layers, e.g., parallax, lenticular, etc, have their individual respective distances adjusted. The method also permits the adjustment of the relative prism vertex angles among the photoactive layers to further control the view-angle distribution of the light transmitted to the LDC display means. Moreover, the method, system and method provides for the enhanced, as modified by or in accordance with and as a function of both, scope and distance of human vision and vantage point in 2D/3D LCDs.

21 Claims, 11 Drawing Sheets

LIQUID CRYSTAL DISPLAY APPARATUS AND METHOD FOR IMPROVING PRECISION 2D/3D VIEWING WITH AN ADJUSTABLE BACKLIGHT UNIT

BACKGROUND OF THE INVENTION

1. Field of the Invention

The present invention relates to liquid crystal display (hereinafter LCD) display technology and associated 2D and 3D viewing of displayed images from the perspective and standpoint of a viewer disposed at various distances and angle of incidences from the LCD itself.

2. Related Art

In recent years, LCDs have been receiving attention as slim, large sized color screen displays, and are becoming increasingly common in business and consumer applications. LCDs are generally provided in electronic products, such as notebook computers, desktop monitors, televisions, digital cameras, DVD players, PDAs, mobile phones, portable gains, and car navigation systems, among other applications. Therefore, the ubiquitous application of liquid crystal technology has led to ever-increasing needs for consistent image display irrespective of viewer positioning away from the display, particularly in three-dimensional applications.

Conventional two-dimensional ("2D")/three-dimensional ("3D") displays utilize passive polarization, e.g., plane extension, separate light transmission, parallax units, and light concentration with lenticular sheets. However, fixed lenticular sheets and parallax units, can limit the scope and distance of human vision. Moreover, the fixed configuration prevents any adjustments to the displayed image. Accordingly, 3D displays are inherently limited in their applications in electronic devices.

Figures 1A, 1B:
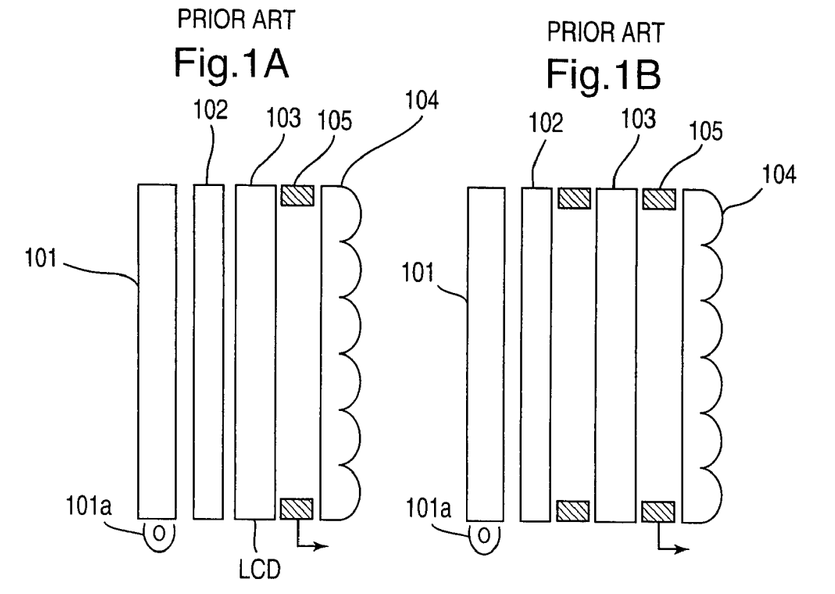

As illustrated in FIGS. 1A-B, the Prior Art LCDs contains various upper, intermediary and lower basic photoactive units. FIG. 1A illustrates a conventional structure comprising a light guide unit 101 and light source 101(a), light diffuser 102, liquid crystal display unit 103, lenticular lens prism array 104, e.g., light concentrator. Toward the back of the entire LCD apparatus, the lower basic photoactive units, such as the diffuser, function to diffuse transmitted light by various means, such as plane extension, polarization, separate light transmission, and light barriers. Toward the front of the entire LCD apparatus, the upper basic photoactive unit has optical structures that function to concentrate transmitted light, e.g., lenticular sheets, wave transmitters, etc. The conventional structure contains an adjustable structure 105 disposed between the display unit and the light concentrator, as illustrated in FIG. 1A. Alternatively, the adjustable structure can be disposed between the display unit and the light concentrator, as well as the display unit and the light diffuser, as illustrated in FIG. 1B.

Figures 2A, 2B:
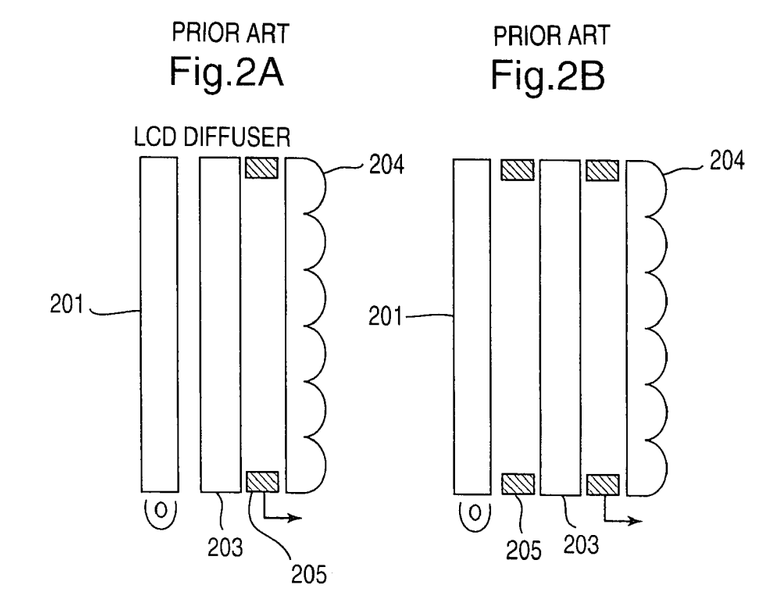

Alternatively, as illustrated in FIGS. 2A-2B, light-guide-diffusing units are also used to diffuse transmitted light in the Prior Art. This is in contrast to distinct light guide 101 and diffuser 102 units of FIGS. 1A-1B. Thus, the conventional structure comprises a combined light guide-light-diffusing unit 201, display unit 203, light concentrator 204, in addition to the adjustable structure unit 205 disposed between the display unit 203 and the light concentrator 204, as illustrated in FIG. 2A. Alternately, as illustrated in FIG. 2B, the adjustable structure 205 can be located between the light-guide-light-diffusing unit 201, as well as the display unit 203 and the light concentrator 204.

Figure 3A:
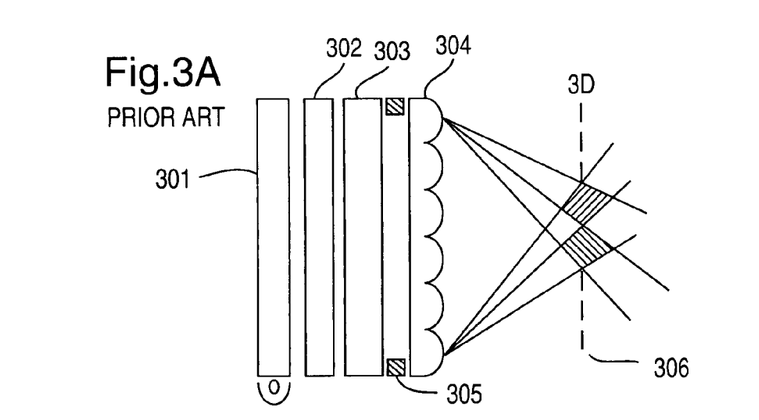
Figure 3B:
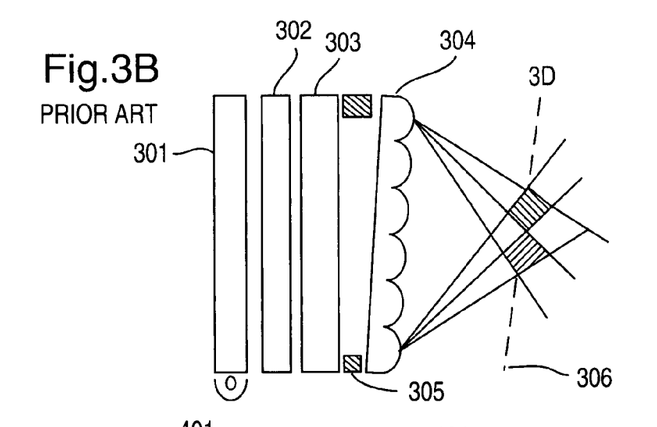

The prior art as recognized in U.S. Pat. No. 6,377,295B1 Zhiren Hu discloses a 2D/3D distance-adjustable display. FIGS. 3A-3B and 4A-4B illustrate a Prior Art construction for 3D display having adjustable light concentrator height. FIG. 3A shows an exemplary fixed 3D focal plane. As illustrated in FIG. 3A, the device contains light guide unit 301, light diffuser 302, display unit 303 and light concentrator 304. Adjustable structures 305 is included disposed between the display unit 303 and the light concentrator 304. The configuration permits the 3D focal plane 306 to be positioned at a predetermined distance away from the entire LCD apparatus. FIG. 3B illustrates the adjustable structure positioning the light concentrator 304 in such a manner to offset the 3D focal plane 306 for viewing.

Figure 4A:
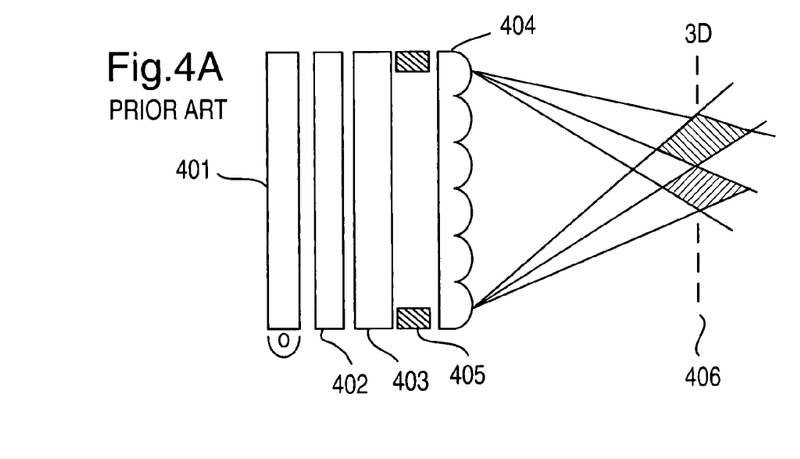
Figure 4B:
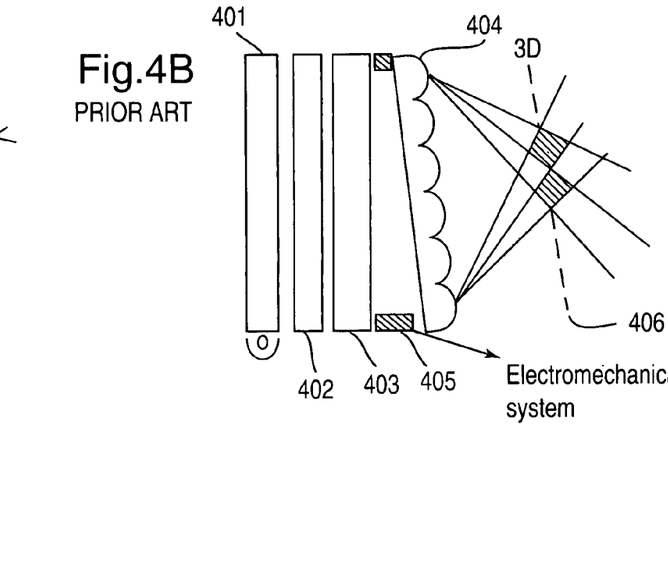

FIG. 4 A-B shows an exemplary 3D focal plane that has been set based upon differentially adjusted electromechanical system components. FIG. 4A illustrates the device of FIGS. 3A-3B, which the device contains light guide unit 401, light diffuser 402, display unit 403 and light concentrator 404. Adjustable structure 405 is configured to permits the 3D focal plane 406 to be positioned at further extended distance away from the entire LCD apparatus, as compared to FIG. 3A. Projected upon the focal plane 406 is the resultant 3D image. FIG. 4B illustrates the adjustable structure 405 positioning the light concentrator 404 in such a manner with an alternate offset of the 3D focal plane 406 for viewing, as compared to FIG. 3B. FIG. 3A and FIG. 4A show the situation of various distance, while FIG. 3B and FIG. 4B show the situation of different angle.

According to Hu, the distance between 3D image displayed can be adjusted, using the adjustment structure according to viewer's location/position. The prior art adjustable structure 405 can be maneuvered using electromechanical means. The adjustable structure 405 are composed of lens arrays, which can be lenticular sheets. Lens array can be hologram array or parallax units. Importantly, it should be noted that the adjustable structure is always disposed on top of or above the display unit 403. Electromechanical transducers connected to mechanical transmitters are used to displace the lens array, lenticular sheets or parallax units. Thus, only an electromechanical structure is disclosed. Electromechanical transducers are comprised of stepper motors, servo motors, or voice coil stages. These means may include mechanical wheel devices or ball-shaped screw devices. The disclosed electromechanical means can be used only with the precise input of information about the precise static location/position of the viewer.

Currently, various electromechanical methods have been investigated in order to modify and adjust the distances between the lenticular sheets and the parallax units. These efforts at modifying the functionality of displays enable the adjustment of the scope and distance for proper human vision. However, the practical application of electromechanical methods have been complex, unreliable, convoluted, and characterized by low levels of accuracy and stability. Moreover, prior art 3D displays tend to have only found application in small palm or desktop electronic devices. Therefore, the application of 3D displays under the present state of the art is not cost effective and somewhat limited in practical embodiments.

Thus, a major disadvantage of the prior art LCDs lies in their requirement for the viewer make major neuro-physiological adjustments in order to view a displayed image depending on the distance from the display. This results in physiological strain and image quality degradation depending on the distance from the focal plan in both 2D, but also more pronounced in 3D displays.

Therefore, there is a present need for an improved apparatus and method for adjusting the viewing characteristic of the LCD itself, irrespective of the distance of the viewer from the focal plan. Further, given the increased application of 2D/3D LCD technology, it recognized that LCDs will be required that provide an increased efficacy in viewing from various distances and different angles from the display with a deleterious viewed image quality. Accordingly, the present invention provides such a precise and cost-effective solution.

SUMMARY OF THE INVENTION

The present invention has been made to solve the problems associated with the prior art LCD's inability to provide a high level of consistency in image quality irrespective of the viewer's distance from the display as described above.

The present invention is directed toward enhancing the viewing characteristics of 2D and 3D LCDs utilizing adaptive structure comprising adjustable photoactive units within the LCDs by use of an adjusting apparatus and method.

It is an object of the present invention to provide visually consistent viewing of displayed images, which is provided by optimizing the focal plane characteristics and profile in LCDs. This primary object of the present invention is achieved principally through the use of unique adaptive structure. The distance between the photoactive units, such as lenticular sheets and parallax units, e.g., light guide units, wave guide, light guide-diffuser units, and diffuser units, is adjusted through the constituent material properties, which can be used to optimize such viewing characteristics. Accordingly, the scope and distance of high quality and precision LCD image viewing is dramatically improved.

It is the principle object of the present invention to provide for the precise and reliable adjustment of the distance between a 2D/3D LCD display and various light concentrator units and light guide/light diffuser units. In addition, it is an object to provide an apparatus and method to simplify the manufacture and operation of such functionality for LCD displays. This is accomplished by reducing the manufacturing costs, while improving apparatus operational stability, visual precision and accuracy. To this end, the distance between the light concentrator unit and the light guide/light guide-diffuser units are adjusted using their constituent material properties and characteristics.

More specifically, it is an object of the present invention to provide a liquid crystal display apparatus for precise 2D/3D viewing, which provides increased consistency and clarity of viewed image from varying viewer standpoints compared to the prior art. The apparatus is configured such that an adjustable backlight unit is disposed in back of or beneath a liquid display unit. The apparatus's adjustable backlight unit comprises a guide unit, photoactive unit and an adjustable structure unit. The adjustable backlight unit permits the spatial distances between the guide unit and photoactive unit to be precisely controlled to provide optimized 2D/3D viewing.

It is another object of the present invention to provide a liquid crystal display system for precise 2D/3D viewing, which provides increased consistency and clarity of viewed image from varying viewer standpoints. The system is configured such that an adjustable backlight means is disposed in back of or beneath a liquid display means. The system's adjustable backlight means comprises a guide means, photoactive means and an adjustable structure means. The adjustable backlight means permits the spatial distances between the guide means and photoactive means to be precisely controlled to provide optimized 2D/3D viewing.

It is another object of the present invention to provide a liquid crystal display method for the precise 2D/3D viewing, which provides increased consistency and clarity of viewed image from varying viewer standpoints. The method involves providing an adjustable backlight unit, which is disposed in back of or beneath a liquid display unit. The method further involves providing an adjustable backlight unit having a guide unit, photoactive unit and an adjustable structure unit. The adjustable backlight unit permits the spatial distances between the guide unit and photoactive unit to be precisely controlled to provide optimized 2D/3D viewing.

Further, the material properties and characteristics, such as electrical, extension, temperature, and pressure) are modified in accordance with and as a function of both the scope and distance of human vision and vantage point. In addition, the present invention can be applied to conventional LCD mechanical structures in order to reduce manufacturing and operational cost and complexity.

Accordingly, it is an object of the present invention to enable the adjustment of the distance between the lenticular sheets, parallax units and the 2D/3D LCD display. This is accomplished by adjusting those distances as a function of the constituent material properties and characteristics, such as electrical, extension, temperature, and pressure.

It is yet another object of the present invention to provide alternate means to modify the constituent material properties and characteristics to adjust the distance between the lenticular sheets and parallax units.

It is yet another object of the present invention to utilize conventional 2D/3D LCD display mechanical structures to adjust the distance between the light concentrator unit and parallax units.

These and other objects in advantages of this invention will become apparent when considered in light of the following description and claims when taken together with the accompanying drawings.

BRIEF DESCRIPTION OF THE DRAWINGS

The accompanying drawings, which are included to provide further the understanding of the present invention and are incorporated in and constitute a part of the specification, illustrating samples of the present invention and together with the description serve to explain the principles of the present invention.

The invention will now be described further with reference to the accompanying drawings in which:

FIG. 1 A-B illustrates a PRIOR ART LCD structure having an adjustable structure according to an embodiment of the present invention.

FIGS. 2 A-B illustrates a PRIOR ART LCD structure having a plurality of adjustable structures according to an embodiment of the present invention.

FIGS. 3 A-B illustrates a PRIOR ART for 3D LCD structure.

FIGS. 4 A-B illustrates a PRIOR ART for 3D LCD structure.

FIGS. 7 A-F illustrates cross-sectional views of the LCD adjustment apparatus according to various embodiments of the present invention.

DETAILED DESCRIPTION OF THE PREFERRED EMBODIMENTS

The following section describes an embodiment of the present invention based on drawings, while exemplifying the adjustable 2D/3D LCD viewing apparatus, system and method of the present invention.

According to the present invention, the unique characteristics of the invention's constituent materials, such as electrical, dimensional extension, temperature, and pressure is utilized to vary the distance between photoactive units. In addition, traditional LCD mechanical design is utilized to adjust the distance between the light concentrator unit and the parallax units, which include light guide units, light guide-diffuser, diffuser units and polarizing units.

In 2D/3D crystal displays, the image formation characteristics of the 3D display is significantly effected by the distance between the light diffuser unit and display unit, as well as the distance between display unit and lenticular lens, e.g., light concentrator, respectively. Varying the distance will result in differing light paths, which can alter the image formation side of the 3D display. Accordingly, the principle object of the present invention is to create adjustable 2D/3D display apparatus.

Manufacturing adjustable 3D display using electromechanical structures is highly complex and lacks image stability and precision. In order to address the disadvantages of the prior art, the present invention utilizes characteristics of the adjustable structure constituent materials themselves, along with conventional mechanical structure to make 2D/3D adjustable focal plane displays.

Figure 5A:
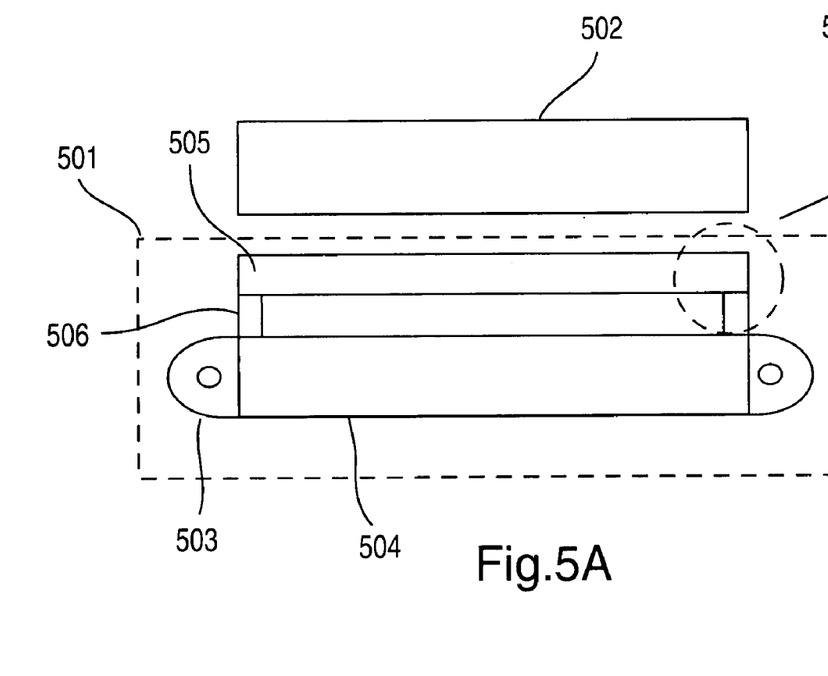
FIGS. 5A-B illustrate cross-sectional views of the LCD adjustment apparatus according to an embodiment of the present invention.

Accordingly, the viewable depth and distance of the 3D display can be precisely controlled as shown illustrated in FIG. 5. In FIG. 5, the adjustable backlight unit 501 and LCD display unit 502 of the preferred embodiment of the present invention's LCD apparatus are shown. The adjustable backlight unit 501 is comprised of light sources 503, light guiding unit 504, adjustable photoactive unit 505, and adjustable structure 506. According to the present invention, the adjustable photoactive unit 505 can be parallax, diffuser, polarizer or light concentrator units and combinations thereof.

According to the present invention, the sharpness of the 3D display can be adjusted using the light guiding unit, diffuser, parallax, or the display board, which can be maneuvered using traditional mechanical design.

Figure 5B:
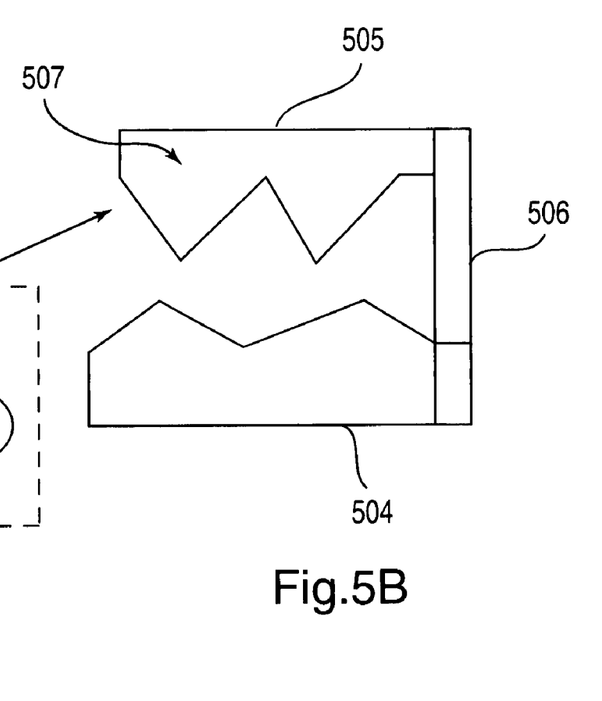

FIG. 5B illustrates an enhanced view of a section of the preferred embodiment of the present invention, wherein adjustable backlight unit 501 of the present invention consists of photoactive units 505, which may include prism arrays 507, which can be wave guide or light guide, according to this invention. Prism array can be transparent convex or concave sheets, which can have very different rate of reflection. The adjustable backlight unit 501 of the present invention can consist of lens arrays, such as lenticular sheets.

FIG. 6 illustrates various embodiments of the adjustable structure of the present invention. The constituent material properties, such as electrical, dimensional extension, temperature, and pressure, in addition to and/or in conjunction with traditional mechanical design, are utilized to adjust the spatial distance, e.g., (up, down, left, and right), between the adjustable backlight unit 501 components, e.g., light guide unit/wave guide/prism array structures and the adjustable photoactive units 505, such as parallax units, wherein the adjustable backlight structure 506 is disposed below the LCD display unit 502.

Figures 6A, 6B:
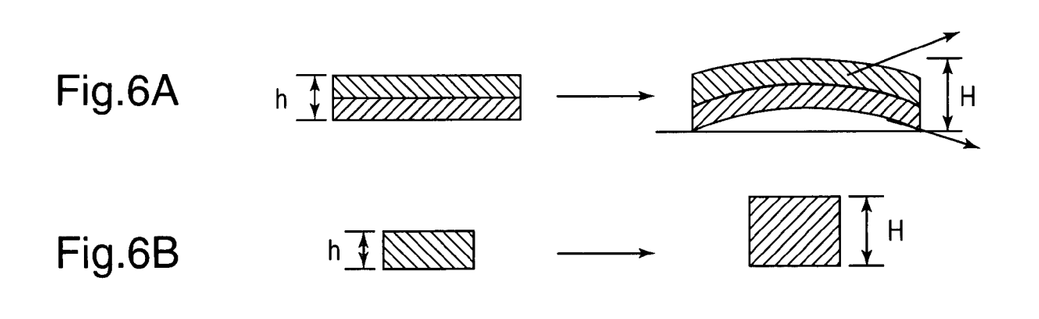
FIGS. 6A-E illustrate cross-sectional views of the LCD adjustment structure unit according to various embodiments of the present invention.
Figure 6C:
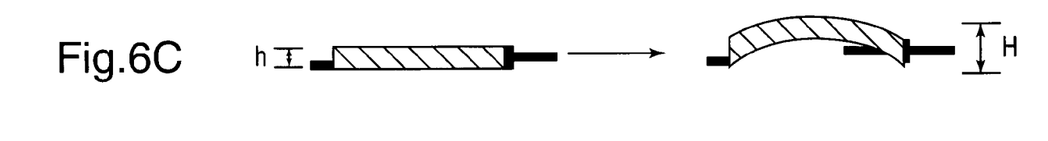
Figure 6D:
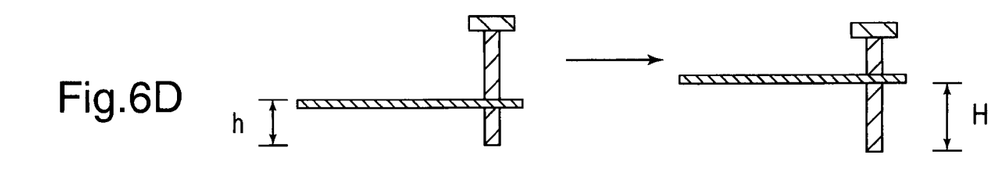
Figure 6E:
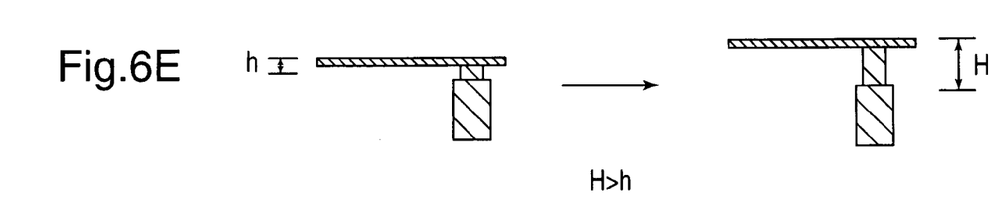

The following mechanisms are illustrated in FIGS. A-E for the adjustable structure of the present invention. FIG. 6A illustrates the variation from low temperature (h) to high temperature (H). FIG. 6B illustrates the variation from low voltage (h) to high voltage (H). FIG. 6C illustrates the variation from low pressure (h) to high pressure (H). FIG. 6D illustrates the variation from a low mechanical height (h) to a high mechanical height (H). Finally, FIG. 6E illustrates the variation from a low liquid pressure (h) to a higher liquid pressure (H). Therefore, the present invention provides for a multitude of means for the adjustable structure to provide the spatial movement between photoactive units of the adjustable backlight unit.

FIGS. 7 A-F illustrates various embodiments of the LCD adjustment apparatus of the present invention. In FIG. 7A, this embodiment of the present invention comprises the LCD apparatus having the adjustable backlight unit 701, liquid crystal display unit. The adjustable backlight unit 701 further comprises light sources 703, guide unit 704, guide unit prism array 704(a), photoactive unit 705 having a prism array 705(a) and the adjustable structure unit 706. An expanded view is also included. In this embodiment, the photoactive unit 705, such as a diffuser, polarizer, etc., has a flat top surface 705(b). The guide unit 704 according to this invention, may be a light or wave guide. The distance between the guide unit 704 and photoactive unit 705 is adjusted according this the present invention by the adjustable structure units 706. It should be noted that this embodiment contains two prism arrays 704(a) and 705(a).

Figure 7A:
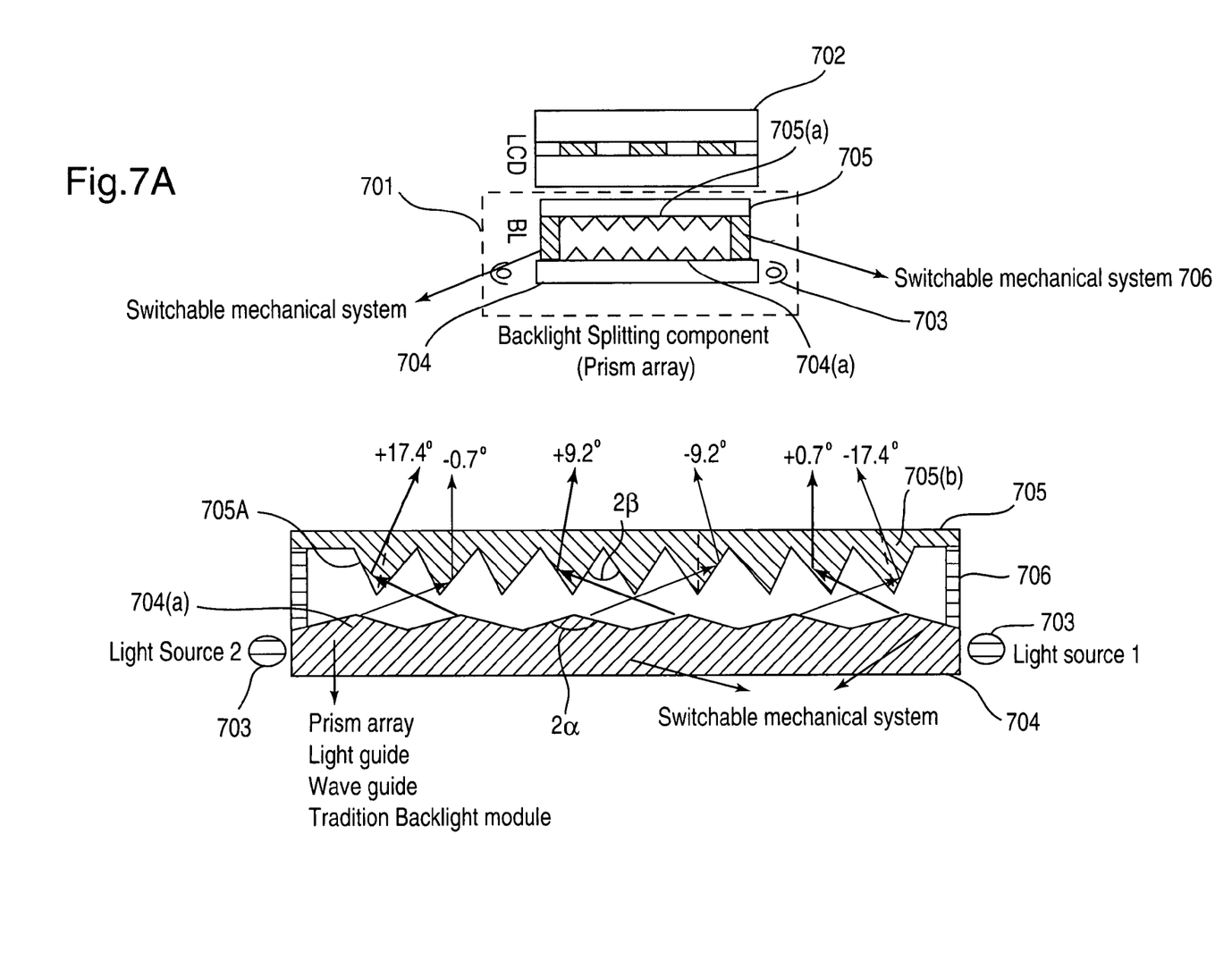
Figure 7B:
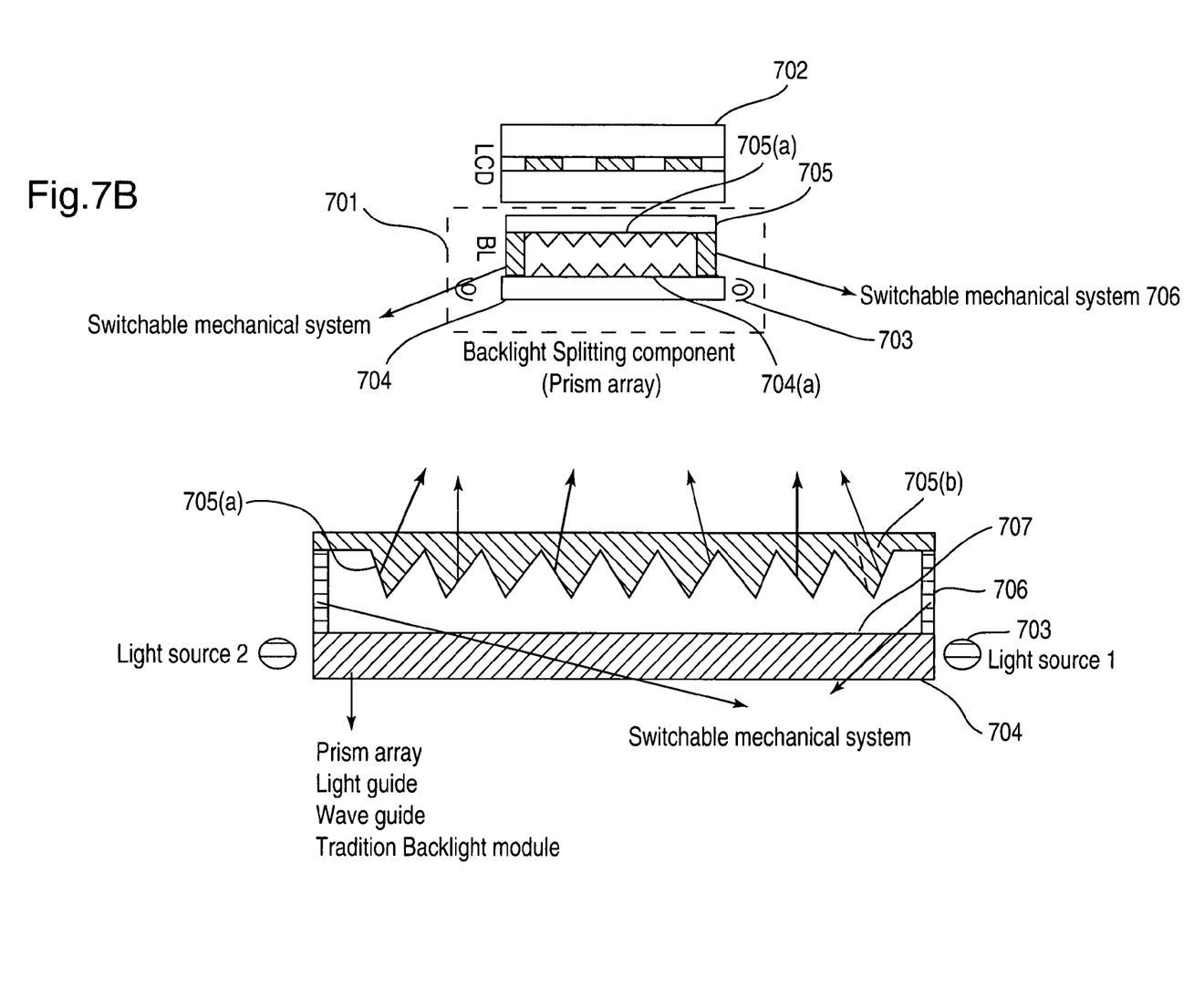
Figure 7C:
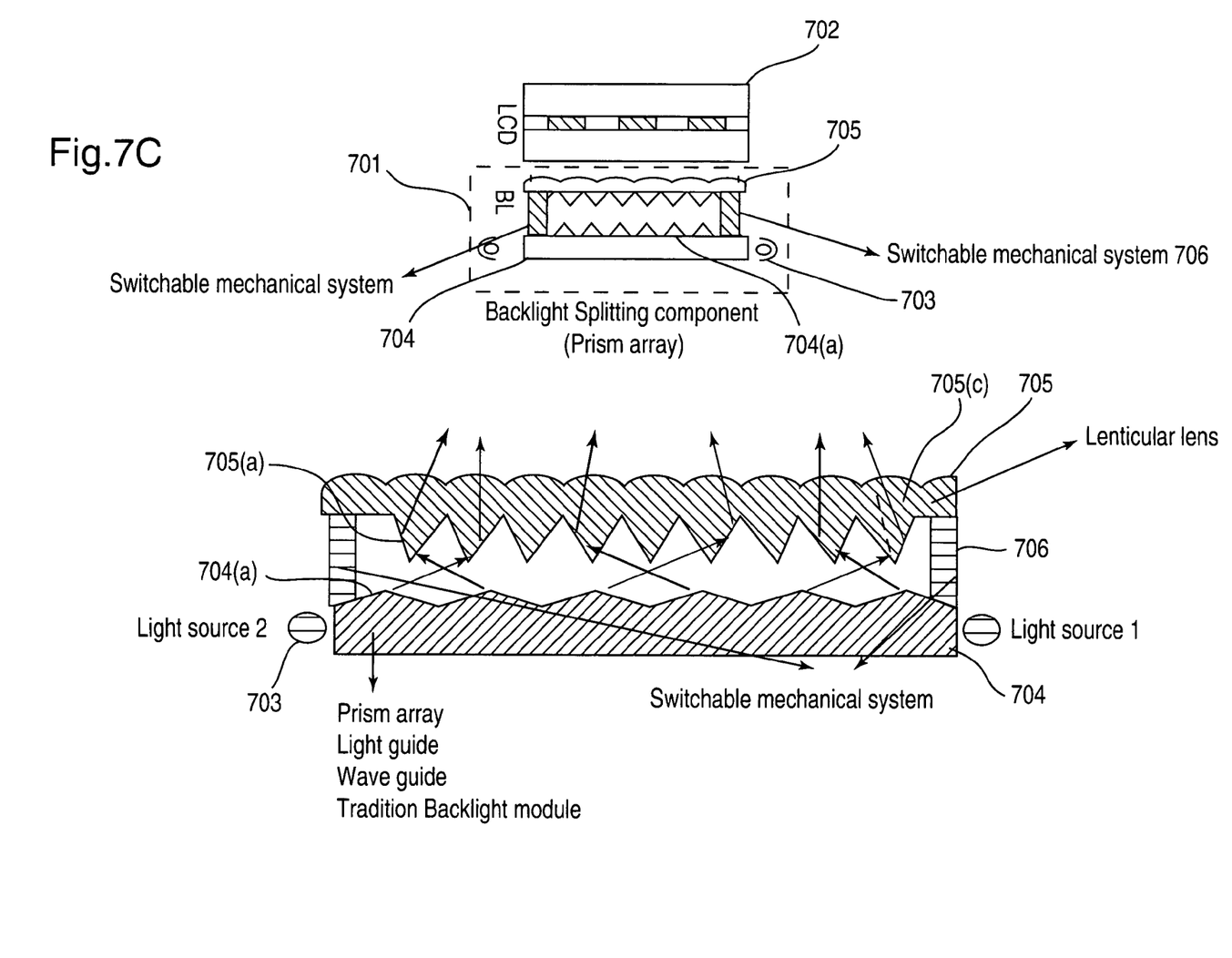
Figure 7D:
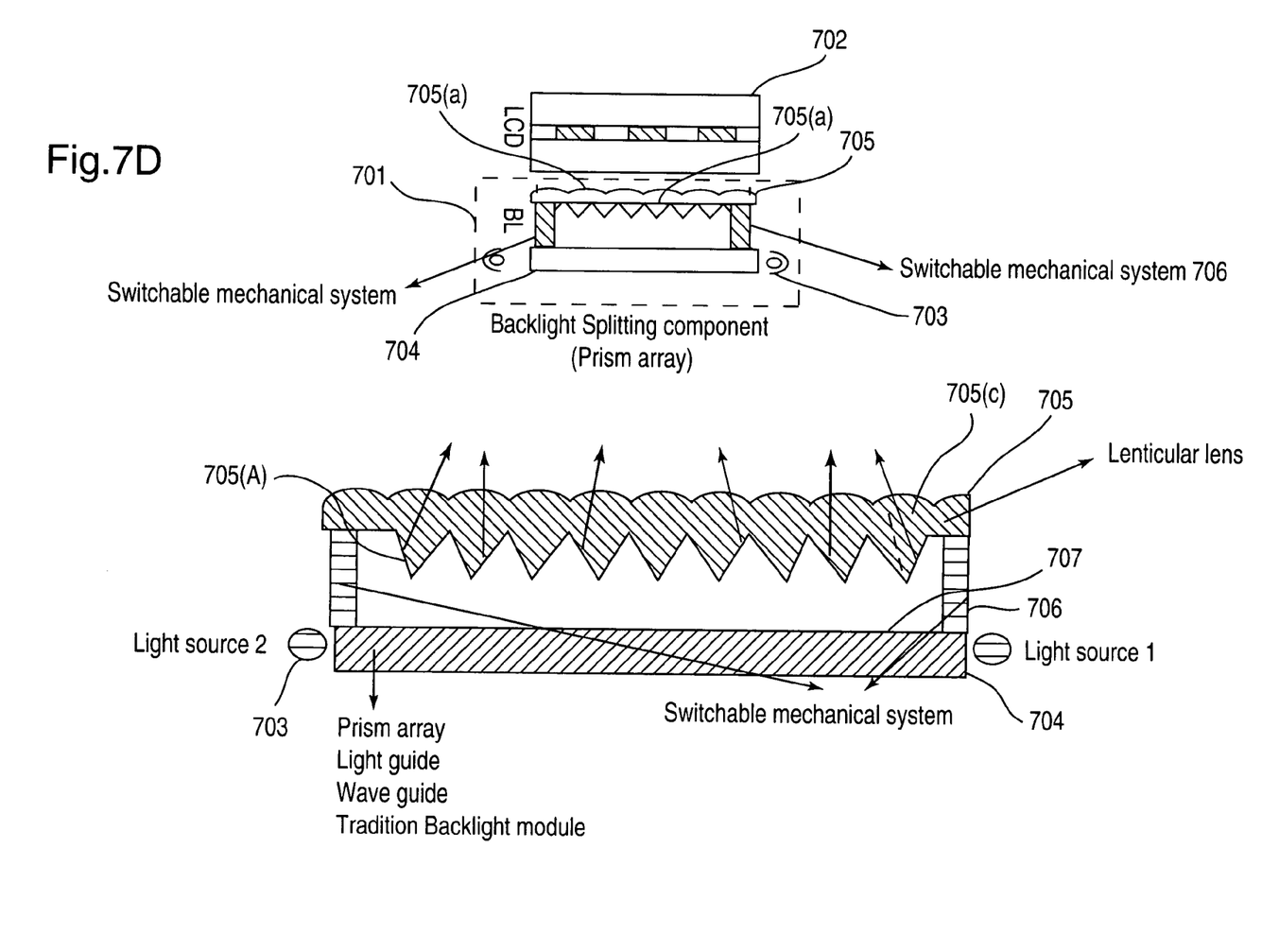
Figure 7E:
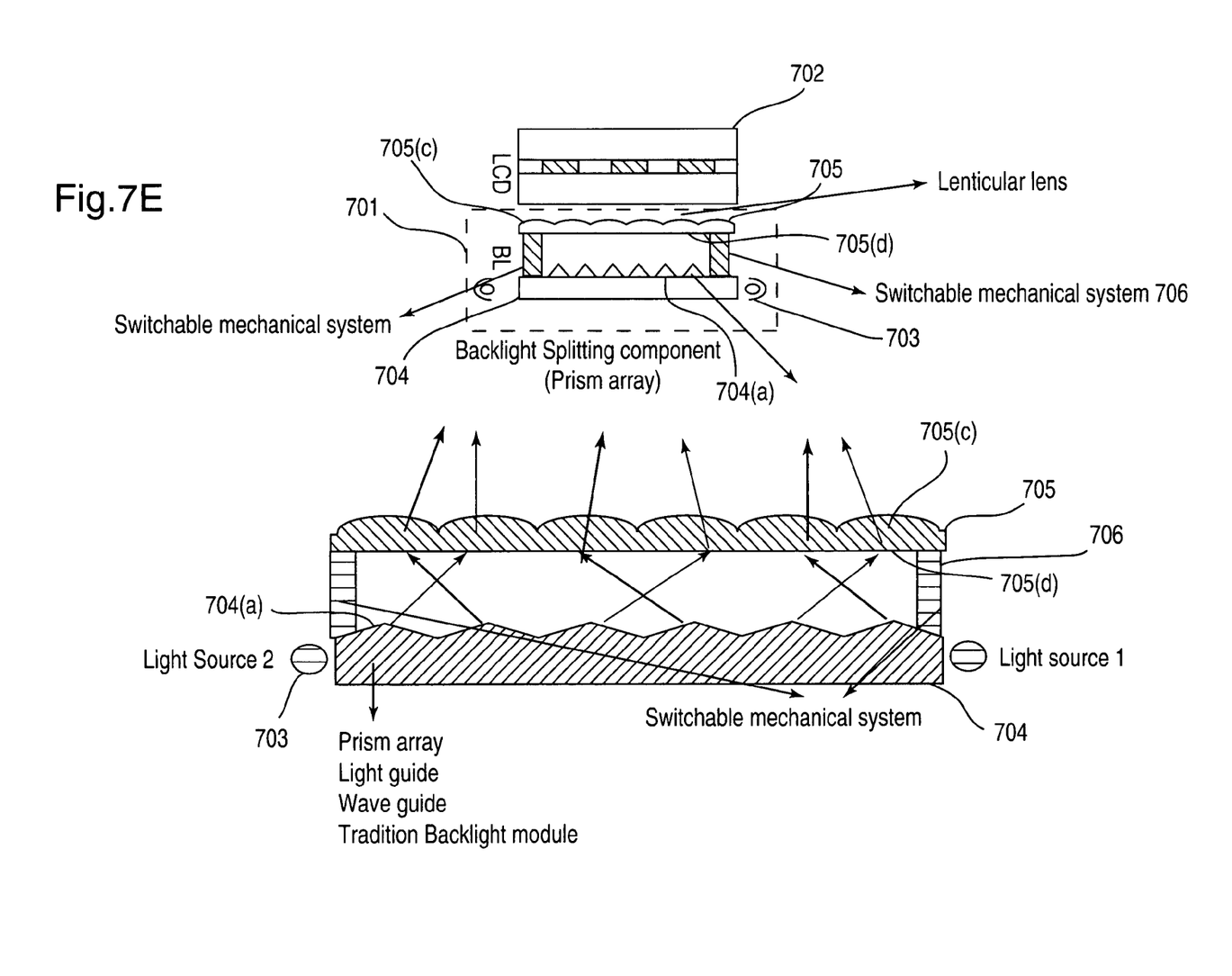
Figure 7F:
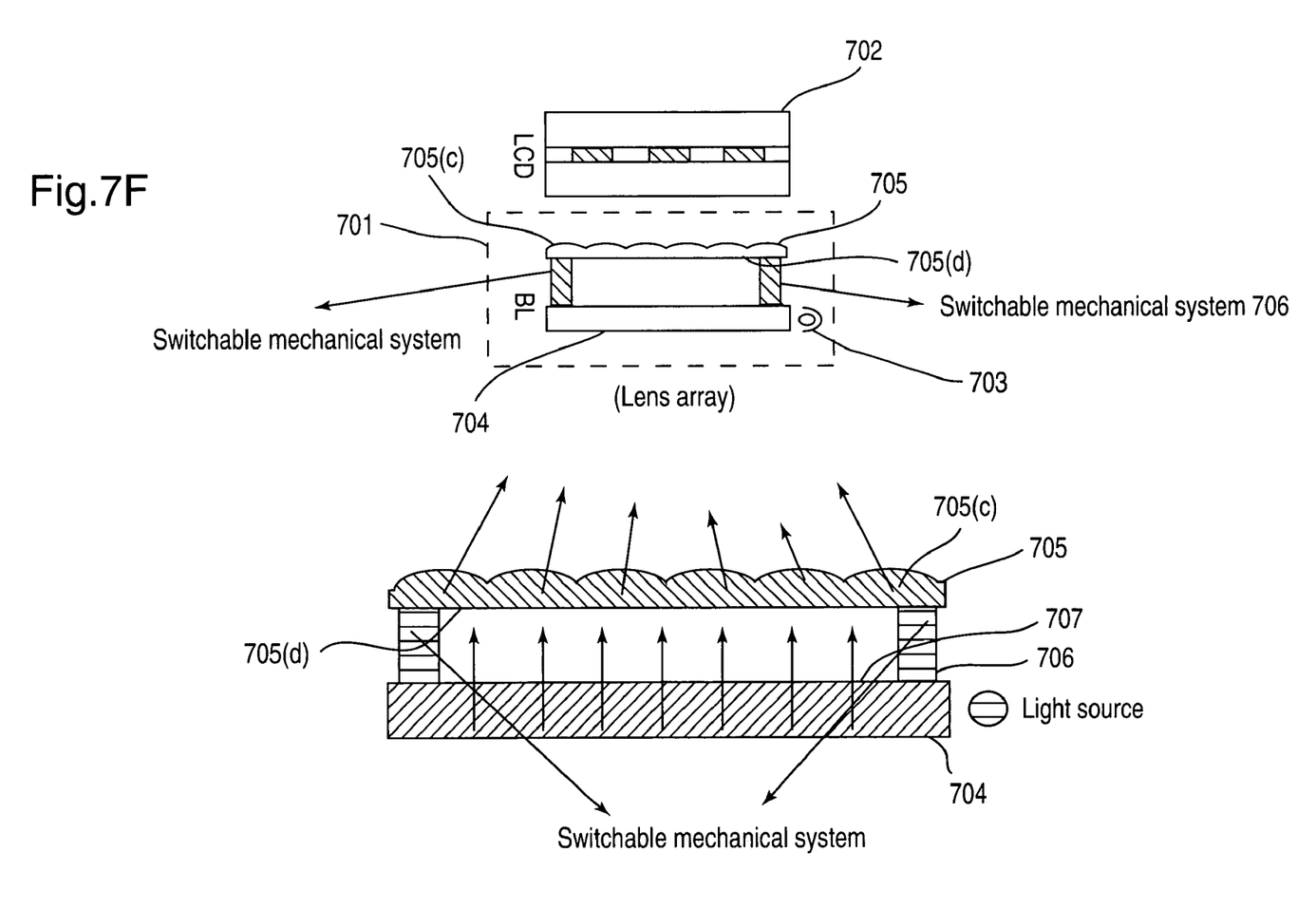

FIGS. 7B-E illustrate various alternate embodiments of the present invention. In FIG. 7B, the guide unit 704 does not contain a prism array 704(a), but maintains a flat top surface 707. In FIG. 7C, the photoactive unit 705 is a lenticular sheet prism array having convex top surface 705(c). FIG. 7D, the guide unit has a flat top surface 707. FIG. 7E illustrates the photoactive unit having a flat lower surface 705(d) and concave top surfaces 705(c). Finally, FIG. 7F illustrates a flat top surface for the guide unit 707, along with a flat lower surface 705(d) for the photoactive unit 705 in the form of a lenticular sheet.

It should be noted that the present invention's light/wave guide units and diffuser units can be comprised of one or more prism arrays. The prism array can be of regular or irregular shape. It can be a combination of straight or divided configuration, as well as that of equal or differing angles of incidence.

The resulting parallax effect of the present invention can be produced by various combinations and configurations of the adjustable backlight unit's lens array, light concentrators, or parallax units.

Accordingly to the present invention, the adjustable structure's electrical property, linear coefficient of expansion, temperature, and response to pressure characteristics are utilized. Structure of this kind can operate according to oil pressure, temperature or voltage adjustment, pressure (gas, or liquid) adjustment, or it can operate in ways of wheels, screws, and material elasticity. As stated previously, the present invention also utilizes conventional mechanical structures to displace the adjustable photoactive units, such as screws.

The adjustable structure of the present invention is operable manually, wirelessly, or by direct or tangential contact between the adjustable structure and the photoactive units.

Figure 8:
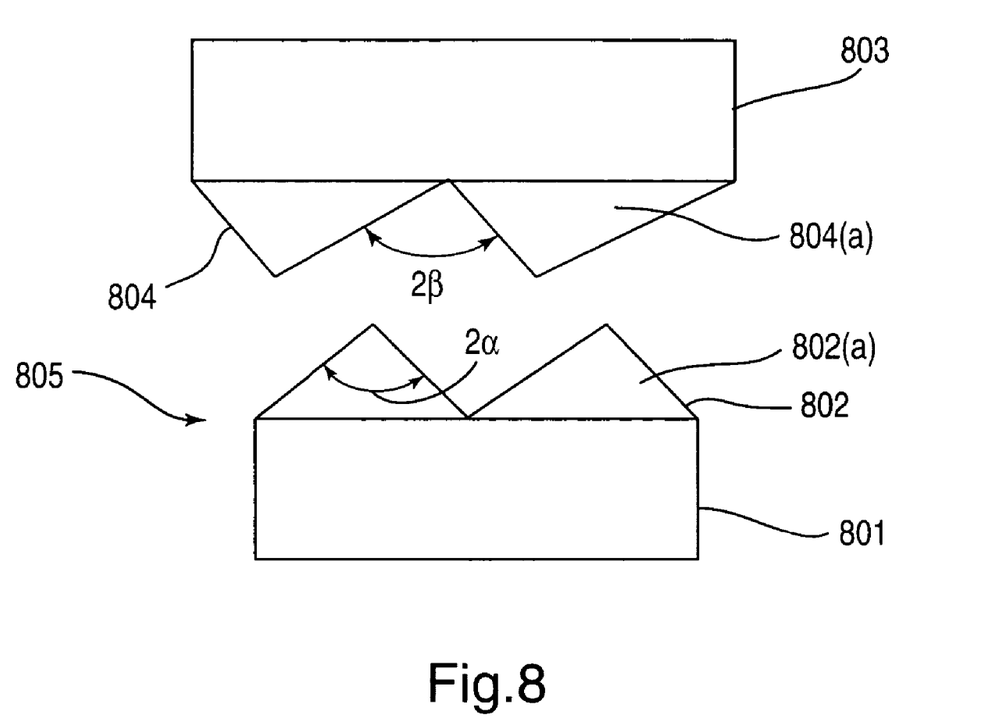
FIG. 8 illustrates a cross-sectional view of the angular ranges of the LCD adjustable backlight unit's guide unit prism array vertices relative the photoactive unit's prism array vertices according to an embodiment of the present invention.

FIG. 8 illustrates the angular relationship between the adjustable backlight unit's guide unit 801 (e.g., light or wave) prism array 802 and the photoactive layer's 803, e.g., light concentrator, prism array 804 vertices 804(*a*). Accordingly, the photoactive layer's prisms 804 have a top vertex 804(*a*) directed toward the light emitting surface 805 of the guide unit 801. The angle between vertices 804(*a*) for the photoactive layers are represented by 2β, e.g., 10°-70°, while the angle between the vertices 802(*a*) of the prism array of the guide unit is represented by 2α, e.g., 140°-179°.

Accordingly, the functional objective of the present invention is to enhance the sharpness of the display by adjusting the distance between the adjustable backlight unit, along with its constituent photoactive units, and ultimately the display unit horizontally, vertically, or in any direction desirable.

In summary, the photoactive layers of the present invention's adjustable backlight unit have their individual respective distances adjusted, such that the view-angle distribution characteristics are optimized for 2D/3D LCDs. Accordingly, the present invention permits the adjustment of prism vertex angles within the adjustable backlight unit to control the view-angle distribution of the light transmitted to the LDC display unit.

Those skilled in the art will recognize that the device and methods of the present invention has many applications, and that the present invention is not limited to the representative examples disclosed herein. Although illustrative, the embodiments disclosed herein have a wide range of modification, change and substitution that is intended and in some instances some features of the present invention may be employed without a corresponding use of the other features.

Moreover, the scope of the present invention covers conventionally known variations and modifications to the system components described herein, as would be known by those skilled in the art. Accordingly, it is appropriate that the appended claims be construed broadly and in a manner consistent with the scope of the invention.

What is claimed is:

1. A liquid crystal display apparatus for improved 2D/3D viewing, comprising:
   a liquid crystal display screen unit;
   an adjustable backlight unit, wherein said backlight unit is disposed behind said display screen unit, such that the adjustable backlight unit varies the focal plane of the resultant image, said adjustable backlight unit comprising:
      a guide unit;
      a photoactive unit;
      an adjustable structure unit connected between the guide unit and the photoactive unit, wherein the adjustable structure unit varies the spatial distance between said guide unit and said photoactive unit by changing its linear dimensions in response to a directly applied change such that said guide unit and said photoactive unit are linearly displaced relative to each other in a controlled manner; and
   at least one prism array disposed on the surface of the photoactive unit facing the guide unit.

2. The liquid crystal display apparatus according to claim 1, wherein said photo active unit includes a diffuser, a parallax unit, a polarizer, a light concentrator or a combination thereof.

3. The liquid crystal display apparatus according to claim 1, wherein said guide unit includes a light guiding unit or a wave guide unit.

4. The liquid crystal display apparatus according to claim 1, wherein the directly applied change comprises one selected from the group consisting of a change in temperature, a change in pressure, and a change in electrical input.

5. The liquid crystal display apparatus according to claim 1, wherein said adjustable structure changes its linear dimensions in response to a directly applied mechanical strain, such that said guide unit and said photoactive unit are linearly displaced relative to each other in a controlled manner.

6. A liquid crystal display apparatus for improved 2D/3D viewing according to claim 1, further comprising:
   a lenticular lens on the surface of the photoactive unit opposite the guide unit.

7. A liquid crystal display apparatus for improved 2D/3D viewing according to claim 1, further comprising a prism array disposed on the surface of the guide unit facing the photoactive unit.

8. A liquid crystal display apparatus for improved 2D/3D viewing according to claim 7, wherein an angle between vertices of the prism array on the surface of the guide unit facing the photoactive unit is between 140° and 179°.

9. A liquid crystal display apparatus for improved 2D/3D viewing according to claim 1, wherein the prism array has an irregular shape.

10. A liquid crystal display apparatus for improved 2D/3D viewing according to claim 1, wherein the prism array has a regular shape.

11. A liquid crystal display apparatus for improved 2D/3D viewing according to claim 1, wherein an angle between vertices of the prism array on the surface of the photoactive unit facing the guide unit is between 10° and 70°.

12. A liquid crystal display system for improved 2D/3D viewing, comprising:
   a liquid crystal display screen means;
   an adjustable backlight means, wherein said backlight means is disposed behind said display screen means, such that the adjustable backlight means varies the focal plane of the resultant image, wherein said adjustable backlight means comprises:
      a guide means;
      a photoactive means;
      an adjustable structure means connected between the guide means and the photoactive means, wherein the adjustable structure means varies the spatial distance between said guide means and said photoactive means by changing its linear dimensions in response to a directly applied change such that said guide unit and said photoactive unit are linearly displaced relative to each other in a controlled manner and
   at least one prism array disposed on the surface of the photoactive unit facing the guide unit.

13. The liquid crystal display system according to claim 12, wherein said photo active means includes a diffuser, a parallax unit, a polarizer, a light concentrator or a combination thereof.

14. The liquid crystal display system according to claim 12, wherein said guide means includes a light guiding means or a wave guide means.

15. The liquid crystal display system according to claim 12, wherein a directly applied change comprises one selected from the group consisting of a change in temperature, a change in pressure, and a change in electrical input.

16. The liquid crystal display system according to claim 12, wherein said adjustable structure changes its linear dimensions in response to a directly applied mechanical strain, such that said guide means and said photoactive means are linearly displaced relative to each other in a controlled manner.

17. A liquid crystal display method for improved 2D/3D viewing, comprising:
   providing a liquid crystal display screen unit;
   providing an adjustable backlight unit, wherein said backlight unit is disposed behind said display screen unit, such that the adjustable backlight unit varies the focal plane of the resultant image, and wherein said adjustable backlight unit comprises:

a guide unit;

a photoactive unit;

an adjustable structure unit connected between the guide unit and the photoactive unit; and at least one prism array disposed on the surface of the photoactive unit facing the guide unit;

varying with the adjustable structure unit the spatial distance between said guide unit and photoactive unit by varying the linear dimension of the adjustable structure unit; and changing said adjustable structure's linear dimensions by directly applying a change, such that said guide unit and said photoactive unit are linearly displaced relative to each other in a controlled manner.

18. The liquid crystal display method according to claim 17, wherein said photoactive unit includes a diffuser, a parallax unit, a polarizer, a light concentrator or a combination thereof.

19. The liquid crystal display method according to claim 17, wherein said guide unit includes a light guiding unit or a wave guide unit.

20. The liquid crystal display method according to claim 17, wherein directly applying a change comprises directly applying one selected from the group consisting of a change in temperature, a change in pressure, and a change in electrical input.

21. The liquid crystal display method according to claim 17, wherein said adjustable structure's linear dimensions are changed by directly applying a mechanical strain, such that said guide unit and said photoactive unit are linearly displaced relative to each other in a controlled manner.

* * * * *